Nov. 20, 1945. R. F. E. STEGEMAN 2,389,282
MAGNIFYING DEVICE
Filed Jan. 13, 1944
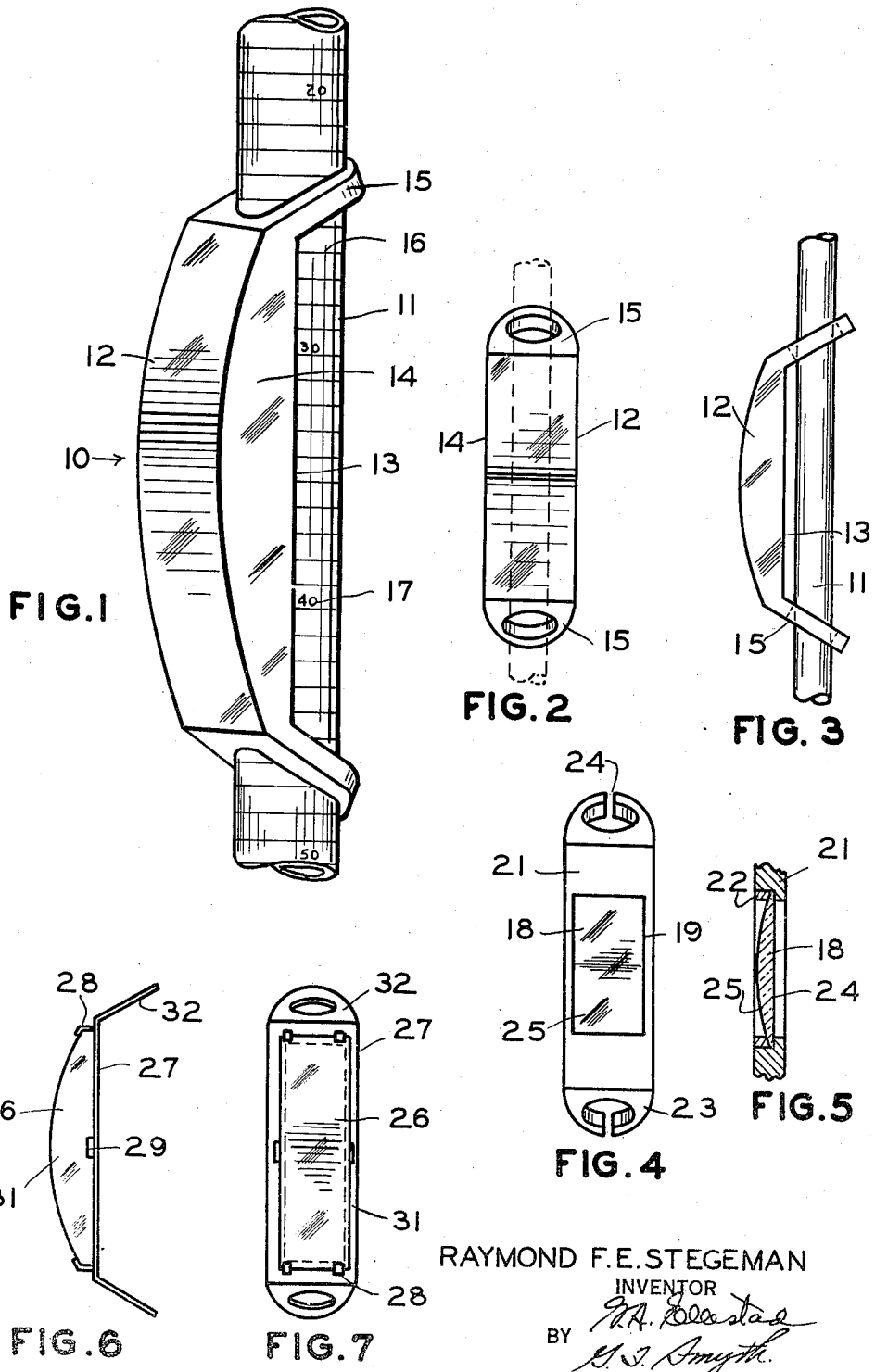
RAYMOND F. E. STEGEMAN
INVENTOR
ATTORNEYS Patented Nov. 20, 1945

2,389,282

UNITED STATES PATENT OFFICE 2,389,282

MAGNIFYING DEVICE

Raymond F. E. Stegeman, Greece, N. Y., assignor to Bausch & Lomb Optical Company, Rochester, N. Y., a corporation of New York Application January 13, 1944, Serial No. 518,067

3 Claims. (Cl. 88—39)

The present invention relates to optical instruments and more particularly to a magnifying device for burettes, thermometers, or other instruments having closely graduated scales.

In clinical and laboratory operations, it is necessary to examine burettes, thermometers and like instruments, having graduated scales thereon for indicating a measurement value by the height of the liquid contained therein. It is oftentimes very difficult, even for persons with normal eyesight, to discern the various index lines on the closely graduated scale to permit the ready ascertainment of the measurement values indicated by the liquid.

It is an object of the present invention to provide a magnifying device for burettes, thermometers, and like instruments, which will enable the user of the instrument to quickly and accurately determine the location of an index line of the closely graduated scale on the instrument.

It is a further object of the present invention to provide a magnifying device for such instruments which permits the ready use thereof without eyestrain and which can be easily attached and detached from the instruments.

Another object of the invention to provide a magnifying device which may be slidably affixed to such instruments and held by spring pressure in frictional contact therewith and which will remain in a predetermined magnifying position until shifted to a new position by the application of manual pressure.

A still further object of the invention is the provision of a magnifying device having attaching means which will so position the magnifying lens adjacent the closely graduated scale of the instrument that sufficient magnification of the scale is effected over a substantial area of the scale for facilitating the use thereof without eyestrain.

Still another object of the present invention is the provision of a suitable magnifying device which possesses the combination of novel features outlined above and which is of a simple and practical design and can be manufactured and sold at low cost and price.

Other objects and features of the present invention will appear hereinafter and while only the preferred forms of construction are described and illustrated, it is to be understood that the invention is not limited to such preferred forms but that various changes and adaptations may be made therein without departing from the spirit of the invention as hereinafter claimed.

Referring to the drawing:

Fig. 1 is a perspective view of one form of magnifying device shown in combination with a burette tube.

Fig. 2 is a front elevation of the magnifying device shown in Fig. 1.

Fig. 3 is a side elevation of the same in combination with a burette tube.

Fig. 4 is a front elevation of a modification of the magnifying device shown in Fig. 1.

Fig. 5 is a partial sectional view showing the lens mounting means of Fig. 4.

Fig. 6 is a side elevation of another form of magnifying device.

Fig. 7 is a front elevation of the same.

In the embodiment of the present invention, as illustrated in Fig. 1 of the drawing, there is shown a magnifying device 10 mounted upon a portion of a calibrated tube 11 such as a burette.

The magnifying device 10 is composed of a flexible transparent material and, for this purpose, various types of synthetic plastic resins may be utilized for forming the device. For example, methyl-methacrylate resins, such as those sold under the trade-name "Lucite," or polystyrene resins, are suitable for this purpose and, having the desired optical properties, may be readily molded to the form of the magnifying device shown in Fig. 1 of the drawing.

The magnifying device 10 is formed to provide a convex front wall 12, a flat rear wall 13 opposite to the convex wall 12, and two flat side walls 14. To mount the magnifier on the burette, apertured attachment members or ears 15 extend rearwardly of the wall 13. The ears 15 are so formed that the axes of the apertures are angularly disposed relative to each other. As the material of which the device is formed is resilient, the ears 15 can be bent inwardly towards each other to position the apertures in substantial axial alignment for receiving the tubular body of the burette. Upon release of the apertured ears 15, the same will tend to resume their normal positions and, by so doing, will cause the defining edges of the apertures to frictionally contact the body of the burette to thereby maintain the magnifier in a predetermined magnifying position on the burette. To shift the magnifier to a new position on the burette body, the ears 15 may again be flexed inwardly toward each other to release the grip of the ears on the burette body whereupon the magnifier may be readily moved to another position.

The convexity of the wall 12 should be such that the cylindrical lens formed will effect a relatively high magnification of the scale of the burette. The apertures of the ears 15 are so formed therein that the ears will position the wall 13, facing the graduations on the scale, in spaced relation thereto so that the image of the index lines 16 and numerals 17 of the scale will be magnified to the extent desired when viewed through the convex wall 12 of the magnifier. The lens is of substantial longitudinal extent, whereby, by its use, an area of substantial length on the scale may be magnified, which is extremely desirable for the ready reading of the fine index lines and small numerals over a relatively large area of the scale.

In the modification shown in Fig. 4, the magnifying device comprises a plano-convex lens 18 formed of plastic material or glass held within an opening 19 in a frame 21 of resilient material. To secure the lens in the frame, a rectangular holding member 22 of plastic or hard rubber is preferably cemented to the walls of the opening in the frame.

Extending outwardly and rearwardly of the frame 21 and formed integral therewith are apertured attaching members or ears 23. The ears 23, in this form of the invention are slit, as indicated at 24, to permit the ready attachment of the magnifying device directly to a tubular body when the body is formed with enlarged extremities, or attachments are secured to the ends of the body, which prohibit the passage of the end of the body through the apertures in the ears 23. As the material of which the ears are formed is resilient, the ears may be expanded to receive the tubular body intermediate its ends. Upon release of the ears, the magnifying device will be securely held on the tubular body in a predetermined position adjacent the scale on the burette or like instrument. By so doing, the portions of the ears 23 between the body and the frame 21 will hold the plano face 24 of the lens 18 spaced from the graduated scale of the instrument to insure the magnification of the scale to the extent desired when viewed through the convex face 25 of the lens.

In the modification shown in Figs. 6 and 7, the magnifier there shown comprises a cylindrical lens 26 formed of glass or plastic material held within a frame 27 of flexible metal. The frame 27 is formed with an aperture of slightly less length and width than the lens 26 and has inwardly turned retaining members or fingers 28 engaging the periphery and convex edge faces of the lens, and also retaining members 29 engaging the side walls 31 of the lens. The inwardly turned extremities of the frame 27 form apertured attaching members or ears 32 for receiving a tubular body upon inward flexing of the ears. Upon release of the apertured ears 32, the edges of the apertures will engage the tubular body and maintain the magnifying device in any desired position on the tubular body. To release the frame for shifting the magnifier to a new position, the apertured ears 32 may be pushed inwardly to release the frictional contact on the body and then moved to the new position. It will be noted that the slight flexing of the apertured ears will be confined to the portions of the ears joining the main body of the frame to thereby prevent any flexing of the frame causing the disengagement of the fingers 28 with the periphery and edge face of the lens. By so doing, the retaining fingers 28 will be maintained in their relative positions and the lens will be securely held during the flexing of the apertured ears 32. It will also be apparent that the portions of the apertured ears 32 intermediate the burette body and the frame 27 will cause the lens to be spaced from the graduated scale of a burette to insure the magnification of the same. The apertured ears 32 may be slotted to permit the direct attachment of the magnifying device to the body of the burette should the end of the instrument be shaped or have attachments thereon, prohibiting insertion of the end in the apertured ears of the magnifier.

While the magnifying device, together with its modifications, has been described and illustrated with reference to the tubular body of a burette, it will be readily apparent that the device may be attached to any elongated body by forming the apertured extremities to any shape or form desirable for the attachment of the magnifying device to elongate bodies of different shapes and forms.

From the foregoing, it will be apparent that I am able to attain the objects of my invention and provide a magnifying device with its modifications for burettes, thermometers, or other instruments having closely graduated scales, which device is of simple and practical design, and may be manufactured at a substantial saving in the cost of magnifying attachments. It will be understood that the above described structure is merely illustrative of the manner in which the principles of my invention may be utilized and that I desire to comprehend within my invention such modifications as come within the scope of the appended claims.

I claim:

1. A magnifying device for use with a body having calibrated graduations comprising a lens for magnifying said graduations; a frame of resilient material having an aperture of substantially the size and shape of said lens; a seat carried by said frame adjacent the aperture and receiving said lens; means for holding said lens to said seat; and spaced flexible apertured members integral with said frame engaging said body for positioning said lens adjacent to any of said graduations, the body being freely received in the apertures when the arms are flexed towards each other, the resilience of the arms normally urging the apertures into frictional engagement with the body.

2. A magnifying device comprising relatively long, narrow lens means and means for adjustably supporting the lens means on an elongated body, said last-named means comprising a pair of normally diverging arms extending from the respective ends of the lens means, each of said arms having an aperture through which the body is passed, the arms being yieldable whereby they may be flexed into substantially parallel relation to receive the body through the apertures, the resilience of the arms normally urging the arms into diverging relation whereby the walls of the apertures are urged into frictional engagement with the body to hold the device in adjusted position on the body.

3. A magnifying device for use with an elongated body having calibrated graduations, said device comprising relatively long, narrow plastic lens means and plastic supporting means integral therewith for holding the lens means in adjusted position on the body, said supporting means comprising a pair of spaced arms positioned at the respective ends of the lens means and normally extending in diverging relationship to each other, said arms having apertures for receiving the body, said arms being flexible whereby they may be flexed into substantially parallel relation so as to freely receive the body through the apertures, the resilience of the arms normally urging them into diverging relation whereby the walls of the apertures will frictionally engage the body.

RAYMOND F. E. STEGEMAN.